(12) United States Patent
Snipes et al.

(10) Patent No.: US 8,001,913 B2
(45) Date of Patent: Aug. 23, 2011

(54) PLANTER WITH CUP BELT METER

(75) Inventors: Terry Lee Snipes, East Moline, IL (US);
Brian Lee Heston, Annawan, IL (US);
Marco Antonio da Silveira Bochi, Sao Paulo (BR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/261,454

(22) Filed: Oct. 30, 2008

(65) Prior Publication Data

US 2010/0107944 A1 May 6, 2010

(51) Int. Cl.
*A01C 7/00* (2006.01)
*A01C 9/00* (2006.01)
(52) U.S. Cl. .................................................. 111/171
(58) Field of Classification Search .......... 111/170–172, 111/177, 178, 200
See application file for complete search history.

(56) References Cited

U.S. PATENT DOCUMENTS

| | | | |
|---|---|---|---|
| 4,193,357 A * | 3/1980 | Freeman et al. | ............... 111/172 |
| 4,221,305 A | 9/1980 | Freeman et al. | |
| 4,243,154 A | 1/1981 | Freeman et al. | |
| 4,530,293 A | 7/1985 | Stiff et al. | |
| 5,357,882 A | 10/1994 | Lemmons | |
| 6,244,201 B1 | 6/2001 | Mauch et al. | |

FOREIGN PATENT DOCUMENTS

DE 19541553 5/1997
* cited by examiner

*Primary Examiner* — Christopher J. Novosad

(57) ABSTRACT

A seed belt cup planter includes seed-intercepting indexing pocket structure facing an adjacent cup on the downward run of the belt towards a furrow for orienting the seed released from the adjacent cup relative to the furrow. In one embodiment, the indexing pocket structure is located on the underside of the cups and receives and orients a cylindrically shaped seed such as a short sugar cane billet. The seed pickup side of the cup is shaped to efficiently receive cylindrical seeds as well as round and oval seeds of differing sizes from a seed puddle. A divider located in the seed hopper between adjacent columns of cups helps channel the seed to the cups and limits pressure on the seed puddle.

16 Claims, 3 Drawing Sheets

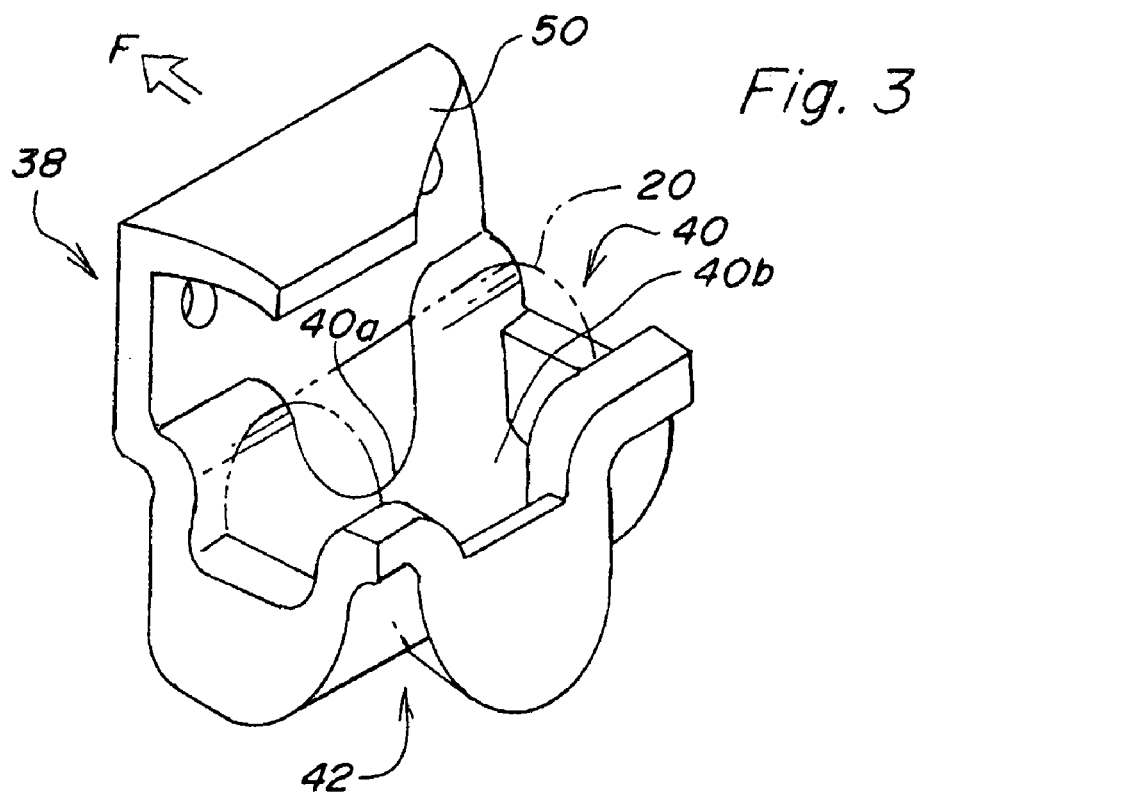
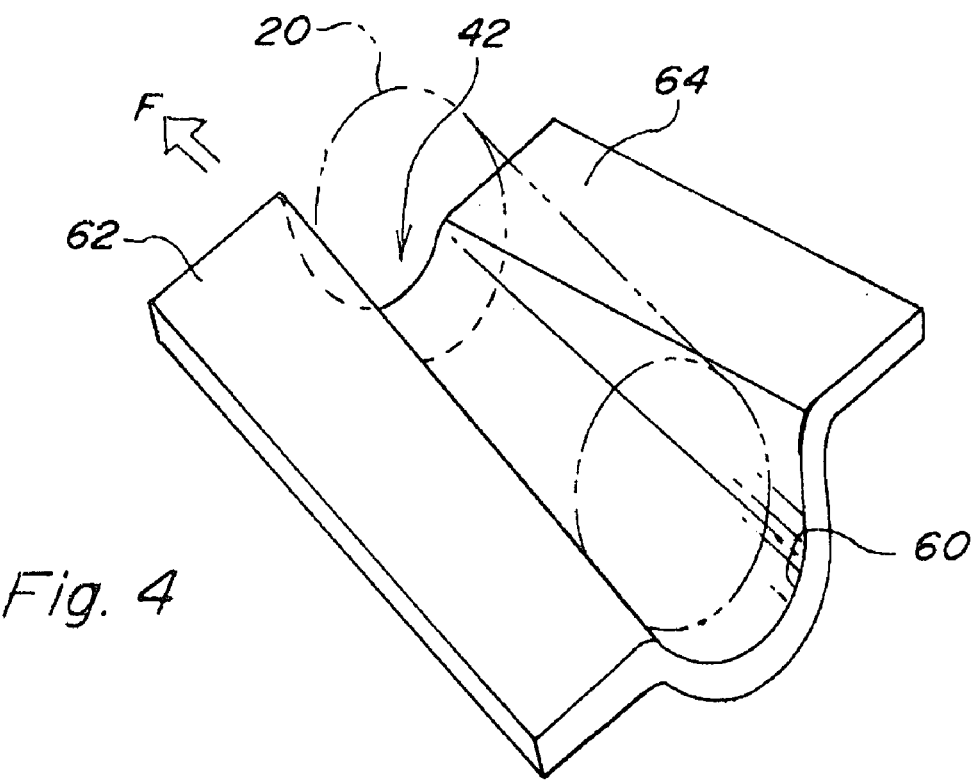

PLANTER WITH CUP BELT METER

FIELD OF THE INVENTION

The present invention relates generally to planters and, more specifically, to cup belt planters.

BACKGROUND OF THE INVENTION

Agricultural implements such as potato planters utilize vertical belt systems with cups for the metering of seed. The cups are attached to an endless belt in two or more columns with the cups staggered vertically from one column to the next. The belt includes a portion which moves upwardly through the hopper from a lower seed puddle to an uppermost pulley, and thereafter a downward portion inverts the cups as they move towards the ground. The cups open upwardly into the seed puddle and then open downwardly to release the seeds towards a furrow in the ground on the downward portion. Adjacent cups are adapted to receive seed as the cups moves upwardly with the belt through the hopper. The seeds typically are singulated by a vibrating device or other singulating structure during upward movement of the cups so that only an individual seed remains in each cup.

Vertical belt cup size is chosen to match seed size. Seed size within a batch of seed can vary, and the seeds can overlap in the cups. Occasionally more than one seed per cup is elevated, and during singulation a seed can return to the puddle and dislodge seeds from adjoining cups. As speed of a vertical belt planter increases, population control typically deteriorates.

Hopper floors are angled downwardly to form the seed puddle toward the lower portion of the vertical belt. Seed piled within the hopper applies considerable pressure in the pickup area resulting in seed damage and increased churning as the cups pass through the seed puddle. The percentage of cup fill and amount of seed damage is influenced by the amount of seed in the hopper.

Typical cups in vertical belt meters are intended for use with round or oval seeds, such as potatoes. Cylindrical seeds, such as short sugar cane billets, are poorly matched to the cup shape. Unacceptable cup fill variations occur for cylindrically shaped seeds. As the cup transitions from an upwardly directed pickup and singulating orientation on the upward portion of the belt path to a downwardly directed release position on the downward portion of the belt path, the seed exits its pickup cup and lodges against the opposite side of the lower adjacent cup with negligible indexing or orientation control for the released seed. For round and oval seeds such as potatoes, the lack of such indexing or orientation usually is not a problem. However, for other seeds such as cylindrical sugar cane seeds, seed position in the furrow is more critical and lack of indexing or orientation control results in decreased productivity.

SUMMARY OF THE INVENTION

The hopper of a cup belt planter includes divider structure to facilitate entry of seed into the cups. A divider, generally in the shape of a triangular cone, is located on the seed hopper floor offset adjacent the front edge of the passing cups. The triangle points upwardly with a predominately vertical wall facing the cups. In addition, a fore-and-aft extending upright plate may be positioned between the columns of cups and the vertical wall to extend upwardly above the height of the cone. In one embodiment, the vertical plate is cantilevered from a bottom connection to deflect as required to prevent binding and soften seed impact. The vertical plate limits or prevents passage of seed laterally from side to side.

The triangular cone redirects seed flow from the hopper to the sides of the belt fill area for filling both columns of cups. The cone also provides a pocket at the front of the cup for seed to collect with minimal puddle pressure for improved cup fill. The divider plate separates the rows of cups and prevents dislodged seeds from impacting and dislodging seeds from other cups. The vertical plate holds seed in proximity to the cup for efficient cup filing. Deflection at the top of the divider prevents binding and minimizes damage to the seeds.

The divider structure reduces sensitivity to seed size, and larger seeds can be accommodated by cups that are smaller than the normally recommended size. Higher speed filling and reduced damage to seeds during cup filling is also provided by the divider structure. Seed pressure and churning in the seed puddle is limited to reduce seed damage.

An improved seed cup is contoured to efficiently receive cylindrical seeds, particularly sugar cane seeds having a length to circumference ration on the order of 3 to 1 or less. In one embodiment, seed is oriented by fore-and-aft and lateral pockets which intersect. Projections above the cup prevent stacking of seeds against the belt and help assure that any seeds resting against the outside of the cup return to the seed puddle. The underside of the cup, which faces upwardly on the downward run of the seed belt, is contoured to form an essentially fore-and-aft extending cylindrical pocket to orient seed released from the above adjacent cup. The pocket extends in the direction of planter travel, and ramps or peaks positioned outboard of the underside pocket re-index the released seed from a typical lateral position on the fill side of the cup to a forward position on the underside of the cup so that the seed is placed fore-and-aft in the seed trench. The indexing or orientation provides improved seed spacing and positioning in the furrow.

These and other objects, features and advantages of the present invention will become apparent from the description below in view of the drawings.

BRIEF DESCRIPTION OF THE DRAWINGS

FIG. 3 is an enlarged front perspective view of an improved cup showing details of the pickup side of the cup.

FIG. 4 is a bottom view of the belt planter seed orienting structure for indexing or orienting a seed released from an adjacent cup on the downward run of the seed belt.

DESCRIPTION OF THE PREFERRED EMBODIMENT

Figure 1:
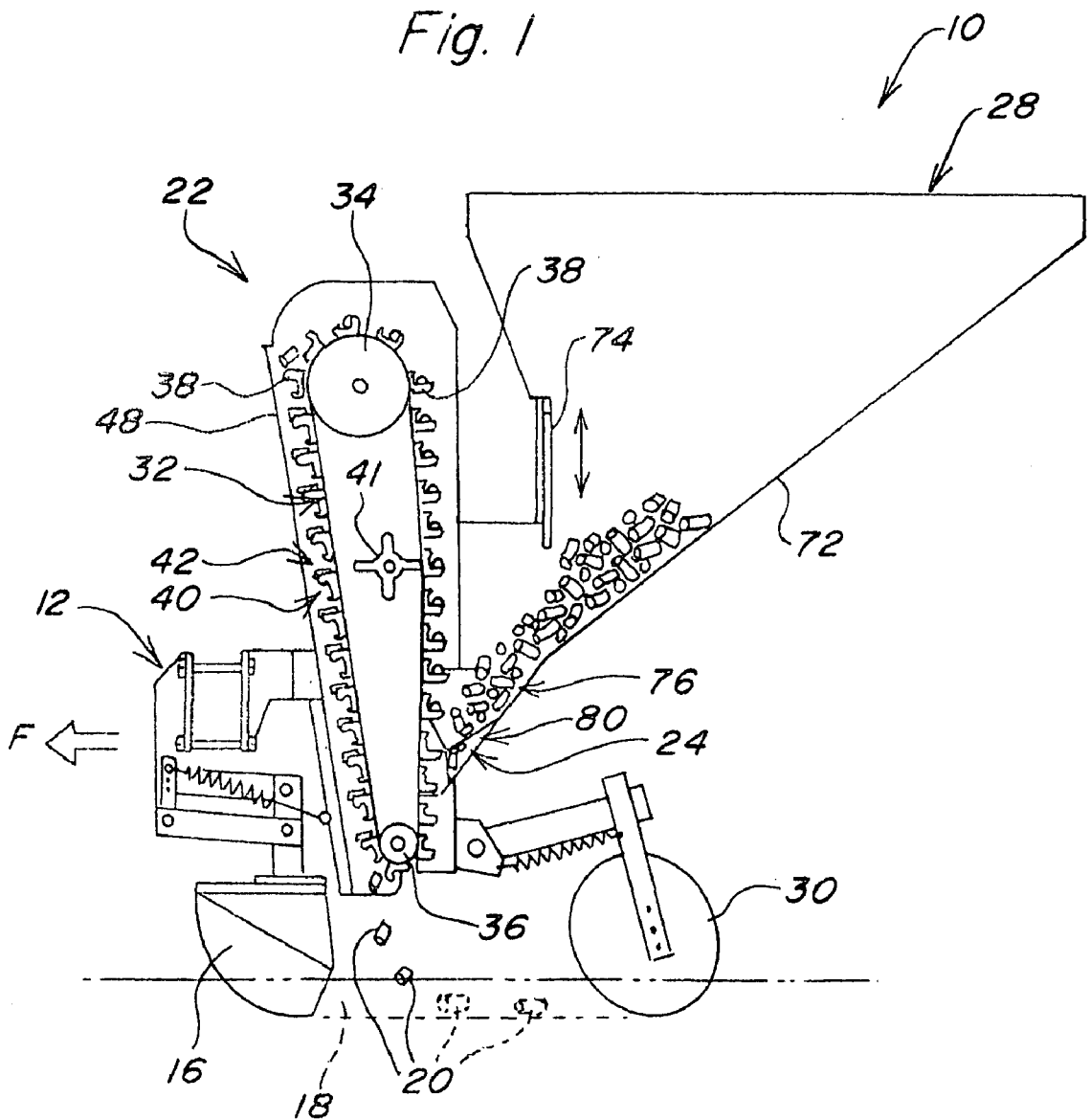
FIG. 1 is a side view of a portion of a cup belt planter.
Figure 2:
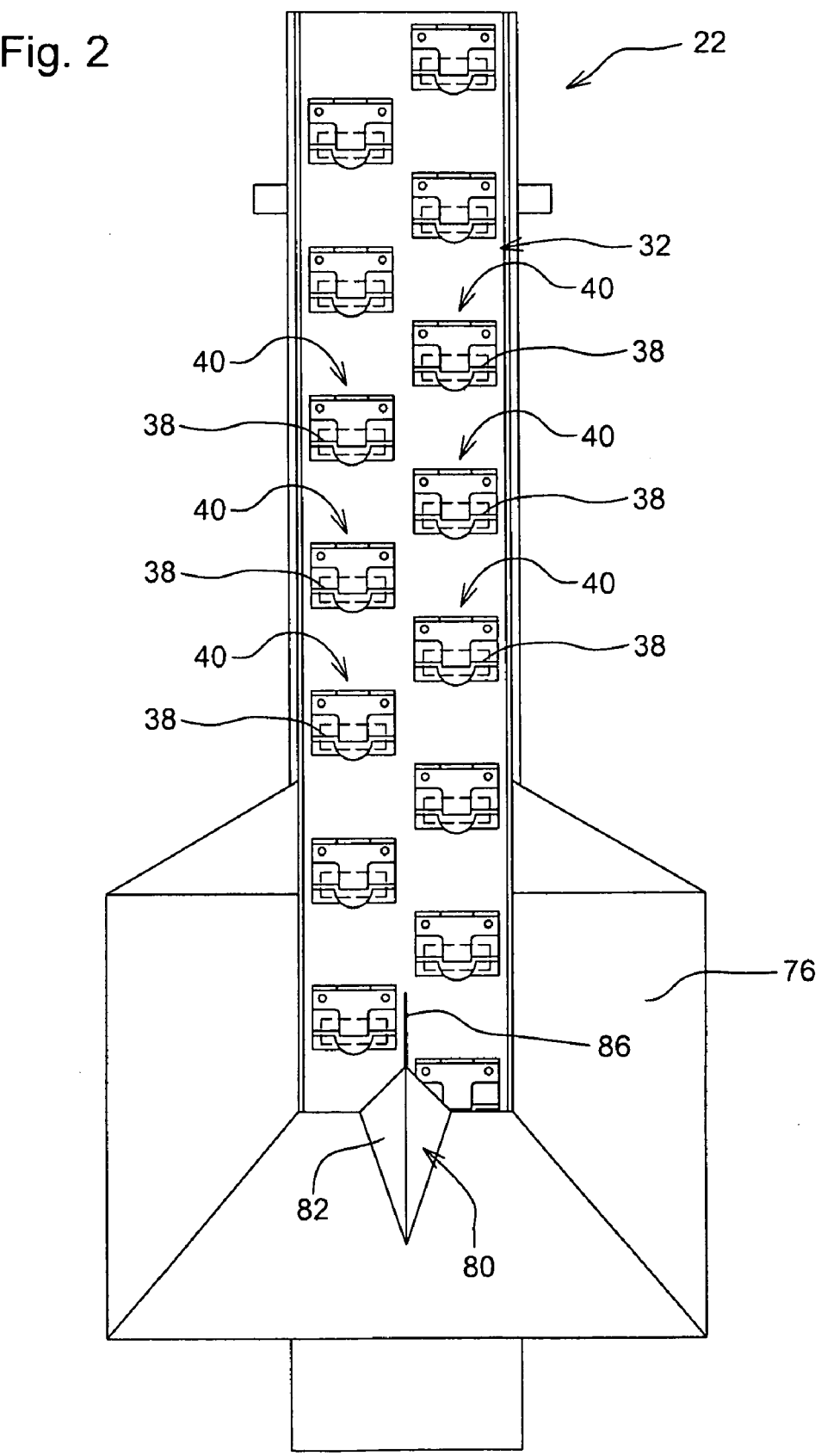
FIG. 2 is an enlarged top prospective view of a portion of the cup belt planter hopper of FIG. 1 showing the seed pickup and divider area.

Referring to FIG. 1, therein is shown a cup belt planter 10 having a main frame 12 supported for forward movement over the ground by a towing implement (not shown). The planter 10 includes an opener shoe or furrowing device 16 depending from the frame 12 for forming a seed-receiving trench or furrow 18 in the ground. Seeds 20 are deposited in the furrow 18 by a row unit or cup belt metering system 22 which picks up the seeds 20 from a seed puddle 24 at bottom of a seed hopper 28 supported on the frame 12. A plurality of the metering systems 22 may be supported at transversely spaced locations on the frame 12. A closing wheel or disk 30 closes the furrow 18 over the seed 20 deposited by the metering system 22. As shown, the planter is similar to a conventional potato planter with the exception of the metering system 22, the hopper 28 and the area of the seed puddle 24.

The metering system 22 includes an endless belt or chain structure 32 trained around an upper pulley or gear 34 and a lower idler 36. The belt structure 32 is driven in a conventional manner so that the hopper side of the belt structure moves upwardly through the seed puddle 24 and the forward section moves downwardly towards the ground. As shown, the belt structure 32 supports two transversely spaced columns of vertically staggered seed cups 38 which open upwardly on the hopper side of the belt path to pick up seeds 20 from the seed puddle 24 and open downwardly on the forward side of the belt path to release the seeds. The cups 38 each have a receiving portion or concave surface indicated generally at 40 opening upwardly for supporting the seed 20, usually in a transversely extending position, as the cups move upwardly through the hopper 28. A singulating device 41 helps assure that only a single seed remains in each cup 38.

As viewed on the upwardly moving section of the belt path (FIG. 3), underside 42 of the cup 38 is concave downwardly. As the belt structure passes over the upper pulley 34, the underside 42 reverses position and is concave upwardly (FIG. 4) to define a seed orientation portion. Seed released from the cup 38 falls to the next lower adjacent seed cup underside 42. The underside 42 is configured to index and orient the released seed in the desired direction. As shown, the seed cup 38 is particularly useful for receiving and locating cylindrically shaped seed, such as short sugar cane billets, having a length to circumference ratio of about 3 to 1. The underside 42 of the cup 38 is shaped to channel the seed 20 from the upwardly adjacent cup 38 to a fore-and-aft extending position and support the seed in that position prior to deposit in the furrow 18. The forward, downwardly directed run of the belt structure 32 is generally contained within a housing 48 to maintain the seed in contact with the seed cups 38 until the cups move around the idler 36.

As shown in FIGS. 3 and 4, the receiving portion 40 includes first and second cylindrical pockets 40a and 40b intersecting at right angles at a central location on the cup 38. The pockets 40a and 40b lie generally on partial cylinders having length to diameter ratios on the order of 3 to 1 for receiving short sugar cane billets or typically cylindrically shaped seed in either a transversely extending position in the pocket 40b (FIG. 3) or, less frequently, in a fore-and-aft extending position in the pocket 40a. A projection 50 extending over the pockets 40a and 40b prevents stacking of seeds 20 against the belt structure 32. The projection 50 moves seed in the seed puddle area away from the filled cup and is shaped to shed any seed that attempts to lodge on the projection.

The underside 42 of the cup includes a fore-and-aft extending cavity 60 lying generally on a partial cylinder corresponding to the shape of a short sugar cane billet or other typically cylindrically shaped seed. The cavity 60 opens upwardly on the downside run of the belt structure 32 to receive the billet 20 (FIG. 4) released from the cup 38 immediately above the cavity 60. Located on either side of the cavity 60 are guiding and orienting ramps 62 and 64 which are angled upwardly and downwardly in the fore-and-aft direction to cause transversely oriented billets 20 to roll and twist to align with the cylindrical cavity for receipt therein. The billet 20 is carried to the release point adjacent the idler 36 and is dropped in generally a fore-and-aft extending attitude into the furrow 20. The underside 42 can be formed integrally with the remainder of the cup or can be formed as a separate piece attached to the cup or to the belt as a separate component.

The seed hopper 28 includes a floor 72 angled downwardly towards the seed puddle 24. An adjustable gate 74 located in the hopper 28 upstream of the seed puddle 24 is moveable vertically in dependence on the flow characteristics of the seed in the hopper. The hopper opens into a feed area 76 which funnels the seed towards the belt structure 32 for pickup by the cups 38. To help control seed flow and reduce seed pressure, seed churning and seed to seed interference during seed pick-up in the seed puddle 24, divider structure 80 is provided adjacent the cups 38 in the seed pickup area. A triangular cone 82 redirects seed flow from the hopper 28 to the sides of the belt fill area for filling both columns of cups 38. The cone 82 also provides a pocket at the front of the cups 38 for seeds to collect with minimal puddle pressure for improved cup fill. A divider plate 86 separates the columns or vertical rows of cups 38 and prevents dislodged seeds from impacting and dislodging seeds from other cups. The vertical plate 88 holds seed in proximity to the cup for efficient cup filing. Deflection at the top of the divider plate 86 prevents binding and minimizes damage to the seeds. The divider structure 80 reduces sensitivity to seed size, and larger seeds can be accommodated within the receiving portion 40. Higher speed filling and reduced damage to seeds during cup filling is also provided by the divider structure. Seed pressure and churning in the seed puddle is limited to reduce seed damage.

Having described the preferred embodiment, it will become apparent that various modifications can be made without departing from the scope of the invention as defined in the accompanying claims.

The invention claimed is:

1. A seed planter for planting seeds in a trench in the ground, the seed planter comprising a seed hopper for receiving round and cylindrically shaped seeds, an upright endless belt supported for movement along a path and including an upward portion adapted for upward movement through the hopper and a downward portion adapted for movement downwardly towards the ground, a plurality of vertically offset cups attached to the endless belt for movement along the path, the cups opening upwardly into the hopper on the upward portion and opening downwardly to release the seeds towards the ground on the downward portion, adjacent cups each adapted to receive an individual seed as the cups moves upwardly with the belt through the hopper, the improvement comprising:
   a concave upwardly seed-intercepting indexing pocket facing one of the upward adjacent cups in the downward portion of the path, the indexing pocket orienting the seed released from the adjacent cup relative to the trench.

2. The seed planter as set forth in claim 1 wherein the indexing pocket includes a concave partial cylindrical portion supporting a cylindrical seed having a length to diameter ratio of approximately 3 to 1 or less.

3. The seed planter as set forth in claim 2 wherein the cups have an upwardly concave surface for supporting the cylindrical seed as the cups move upwardly through the hopper.

4. The seed planter as set forth in claim 1 wherein the hopper includes a hopper floor angled towards the belt and a seed pressure head reducer projecting upwardly from the floor adjacent the path.

5. The seed planter as set forth in claim 4 wherein each of the cups include a leading edge projecting towards the floor and the seed pressure head reducer includes an upright wall adjacent the leading edge.

6. The seed planter as set forth in claim 4 wherein the belt supports at least two transversely spaced columns of the vertically offset cups and the pressure head reducer is located between the spaced columns.

7. The seed planter as set forth in claim 1 wherein the cups include undersides, and wherein the seed-intercepting indexing pockets are located on the undersides.

8. A seed planter for planting seeds in a trench in the ground, the seed planter comprising a seed hopper for receiving the seeds, an upright endless belt supported for movement along a path and including an upward portion adapted for upward movement through the hopper and a downward portion adapted for movement downwardly towards the ground, a plurality of vertically offset cups attached to the endless belt for movement along the path, the cups including a seed pickup surface concave upwardly on the upward portion, the cups opening downwardly to release the seeds towards the ground on the downward portion, the upward movement of the upward portion singulating the seeds in the cups, the improvement comprising:

the cups having an underside including a seed-intercepting orientation pocket concave upwardly towards an upwardly adjacent cup on the downward portion, the pocket orienting the seed released from the upwardly adjacent cup relative to the trench.

9. The seed planter as set forth in claim 8 wherein the pickup surface includes a concave partial cylindrical portion supporting a cylindrical seed having a length to diameter ratio of approximately 3 to 1 or less.

10. The seed planter as set forth in claim 9 wherein the orientation pocket comprises a cylindrically-shaped object receiving portion for orienting a cylindrical seed having a length to diameter ratio of 3 to 1 or less.

11. The seed planter as set forth in claim 8 wherein the hopper includes a hopper floor angled towards the belt and a seed pressure head reducer projecting upwardly from the hopper floor adjacent the path.

12. The seed planter as set forth in claim 11 wherein each of the cups include a leading edge projecting towards the floor and the seed pressure head reducer includes an upright wall adjacent the leading edge.

13. The seed planter as set forth in claim 11 wherein the belt supports at least two transversely spaced columns of the vertically offset cups and the pressure head reducer is located between two of the columns of vertically offset cups.

14. A seed planter moveable in a forward direction over the ground for planting seeds in a trench in the ground, the seed planter comprising a seed hopper for receiving the seeds, an upright endless belt supported for movement along a path and including an upward portion adapted for upward movement through the hopper and a downward portion adapted for movement downwardly towards the ground, a plurality of vertically offset cups attached to the endless belt for movement along the path, the cups including a seed pickup surface opening upwardly on the upward portion, the cups opening downwardly to release the seeds towards the ground on the downward portion, the upward movement of the upward portion singulating the seeds in the cups, the improvement comprising:

the cups having an underside including an upwardly concave cylindrical orientation pocket opening upwardly towards an upwardly adjacent cup on the downward portion, the pocket orienting the seed released from the upwardly adjacent cup relative to the trench.

15. The seed planter as set forth in claim 14 wherein the pickup surface includes a concave partial cylindrical portion supporting a cylindrical seed having a length to diameter ratio of approximately 3 to 1 or less.

16. The seed planter as set forth in claim 14 wherein the orientation pocket comprises a fore-and-aft extending cylindrically-shaped object receiving portion for orienting a cylindrical seed having a length to diameter ratio of 3 to 1 or less.

\* \* \* \* \*